United States Patent
Faber et al.

[11] 3,779,013
[45] Dec. 18, 1973

[54] CLOSED SYSTEM INTERNAL COMBUSTION ENGINE

[75] Inventors: George E. Faber, Los Angeles; Frank F. Kates, Thousand Oaks, both of Calif.

[73] Assignee: Krun Corporation, Santa Fe Springs, Calif.

[22] Filed: Oct. 30, 1972

[21] Appl. No.: 302,169

Related U.S. Application Data

[63] Continuation-in-part of Ser. No. 161,820, July 12, 1971, abandoned.

[52] U.S. Cl. ........... 60/278, 123/119 A, 123/119 E, 123/DIG. 8
[51] Int. Cl. ...................... F02b 75/10, F02n 25/06
[58] Field of Search ................. 60/278; 123/119 A, 123/119 E, 1 A, 2, 3, DIG. 8

[56] References Cited
UNITED STATES PATENTS

| 953,146 | 3/1910 | Jaubert | 60/278 |
| 2,742,885 | 4/1956 | Tawaites et al. | 60/278 |
| 3,013,546 | 12/1961 | Bonifield | 60/278 |
| 3,035,561 | 5/1962 | Siegler | 60/278 |
| 3,642,259 | 2/1972 | Bowden | 60/278 |

*Primary Examiner*—Wendell E. Burns
*Attorney*—Charles E. Wills

[57] ABSTRACT

The exhaust gases from an internal combustion engine which is using gasoline and air as fuel, are passed through a catalytic condenser for converting and/or condensing the products of combustion into various liquids and solids which are removed from the condenser, with the remaining and/or newly formed gases being recycled to the cylinders of the engine for further combustion and/or conversion. The system is operable fully closed with no gaseous exhaust to the atmosphere, with the solids from the condenser being removed by means of a filter, and with the liquids being received in a storage tank.

13 Claims, 3 Drawing Figures

CLOSED SYSTEM INTERNAL COMBUSTION ENGINE

CROSS-REFERENCE TO RELATED APPLICATION

This is a continuation in part of application Ser. No. 161,820, filed July 12, 1971, now abandoned.

BACKGROUND OF THE INVENTION

The present invention relates generally to the power generating art, and more particularly to a novel closed system internal combustion engine which is usable as a power plant, as a stationary engine or as the prime mover in various types of vehicles.

At the present time, there is considerable concern in the United States and throughout the world regarding pollution, and particularly to pollution of the atmosphere by equipment which burns hydrocarbon fuels for energy.

The primary area of concern is the large number of gasoline burning automobiles which are used in urban areas, and which are believed to be primarily responsible for the "smog" which blankets many large cities due to the carbon monoxide, carbon dioxide, aldehydes, and nitrogen compounds which are emitted from their exhaust manifolds.

Efforts have been made and are being made to change the additives used with the gasolines, as by reducing the amount of lead compounds, but it is recognized that it is questionable whether the reduction of the lead compound additives makes any appreciable difference in the "smog" level in major cities in the United States.

Also, various legislative bodies have demanded of the automobile manufacturers that they produce a smog-free engine, but it is indicated that automobile manufacturers are of the opinion that this could not be achieved in less than possibly ten years, if at all.

SUMMARY OF THE INVENTION

With the foregoing pollution problems in mind, and the apparent difficulties with obtaining a hydrocarbon fuel which is free of smog-causing additives, it is an object of the present invention to provide a novel closed system internal combustion engine which does not emit any gaseous exhaust to the atmosphere. More particularly, it is an object to provide a novel internal combustion engine in which the gaseous by-products of combustion are converted into either liquid or solid forms for recovery, or for further use as fuel.

Another object of the present invention is to provide a novel closed system internal combustion engine which does not emit any gaseous exhaust to the atmosphere and which may be similar in construction to the presently known internal combustion engines used in automobiles and trucks. More particularly, it is an object to provide such an exhaust-free engine which can be built from existing internal combustion engines. Specifically, it is an object of the present invention to utilize the presently known internal combustion engines (reciprocating and rotary) as one of the basic components of our novel closed system engine, whereby less time and money will be required for producing an engine embodying the present invention and pollution of the atmosphere can be practically eliminated within a very short period of time using present manufacturing methods and internal combustion engine components.

A further object of the present invention is to provide such an internal combustion engine in which the hydrocarbon fuel is more completely utilized or burned, whereby more power is obtained from each unit of fuel as compared with the amount of power obtained using presently known internal combustion engines.

Yet another object is to provide a novel closed system internal combustion engine which can utilize presently known hydrocarbon fuels, including gasolines containing various types of anti-knock lead compounds, without polluting the atmosphere. More particularly, it is an object to provide such an engine which can utilize fuels containing whatever additives are most beneficial from a standpoint of smoother operation and more power, without regard for the components in the exhaust.

A further object is to provide a novel closed system internal combustion engine which can utilize various types of readily available hydrocarbon fuel, including gasoline, diesel fuel, LPG and alcohol.

Yet another object is to provide such a novel internal combustion engine in which the recoverable by-products obtained from the combusted fuel can be varied in amount and type. More particularly, it is an object to provide such an engine which can be used in stationary power plants for producing both power and chemical by-products.

We have discovered that the aforementioned objects are fulfilled by an internal combustion engine or engines containing first and second banks of combustion chambers, with each bank having separate inlet and outlet means; and a catalytic condenser containing metal surfaces and a cooling coil through which the exhaust gases from both banks of combustion chambers are passed to produce and/or remove water and other liquids and some solids therefrom, the remaining and-/or newly formed gases leaving the condenser being recycled through the two banks of combustion chambers in predetermined proportions for further combustion and/or conversion.

DESCRIPTION OF THE PREFERRED EMBODIMENTS

Figure 1:
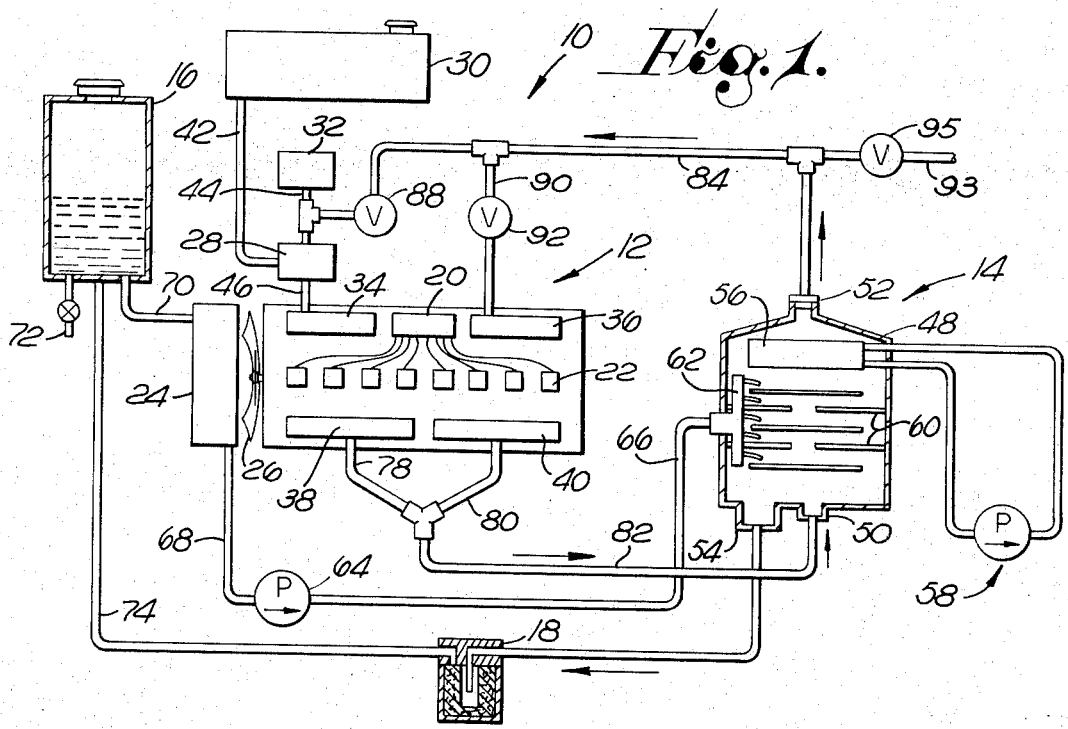
FIG. 1 is a schematic drawing of one form of closed system internal combustion engine embodying the teachings of the present invention.

Referring to the drawing more particularly by reference numerals, particularly FIG. 1, the number 10 indicates generally a novel closed system internal combustion engine constructed in accordance with the teachings of the present invention, which includes an internal combustion engine 12, a catalytic condenser 14, a liquid storage tank 16, and a solid's filter 18.

Although either reciprocating or rotary type engines can be used, for purposes of illustration the engine 12 is described a V-8 engine of conventional construction (such as a 1962 Chevrolet 327 V-8) with a 10/1 compression ratio in the cylinders, and includes conventional pistons, valves and valve stem (not shown), a conventional ignition system containing a distributor 20 and spark plugs 22, a conventional radiator 24 and a fan 26, a conventional carburetor 28 which receives fuel from a conventional gasoline tank 30, and a conventional air inlet and filter assembly 32.

However, the conventional intake manifold is replaced with two separate and smaller intake manifolds 34 and 36, each of which is in communication with only four of the eight cylinders, and, in like manner, the conventional exhaust manifold can be used or it can be replaced with two separate and smaller exhaust manifolds, 38 and 40, each of which is in communication with only four of the eight cylinders.

Although the cylinders are actually interpositioned, for purposes of discussion only, four of the cylinders will be referred to as the front bank of cylinders which are in communication with intake manifolds 34 and exhaust manifold 38, and the other four will be referred to as the rear bank of cylinders and they are in communication with intake manifold 36 and exhaust maniflod 40. As will be described more fully hereinafter with respect to the alternative form shown in FIG. 3, the single internal combustion engine can be replaced with two separate engines (with any number of cylinders) which are interconnected by means of a torque converter or coupling.

In FIG. 1, the gasoline tank 30 is connected to the carburetor 28 by a tube or passage means 42, the air filter and air intake assembly 32 is connected to the carburetor by a tube 44, and the carburetor, in turn, is connected to only the front intake manifold 34 by a tube 46.

Referring to the right hand side of FIG. 1 and the catalytic condenser 14, it includes a housing 48 with an inlet 50 and a gas outlet 52, and a sump 54. Positioned adjacent the top of the housing by way of illustration, is the coil 56 of a cooling assembly 58, such as a conventional aircraft oil cooler.

A plurality of metal baffles 60 are positioned below the coil 58, and, in the preferred construction, are in the form of spaced apart plates made of nickel. Adjacent one side of the plates is a bank of nozzles 62 which is positioned to flush solid particles from the plates 60.

We have also successfully used metal "wool," i.e. twisted thin ribbons of metal, together with and in place of the plates 60. It is also believed that metal screening can be used for the same purpose. Thus, when we refer to metal baffles, we contemplate the use of plates, wool, screen or any other physical form which will provide a plurality of surfaces in the flow path and which will receive discrete solid particles which are in the exhaust gases or which are formed in the catalytic condenser 14.

Also, although the plates 60 are shown in FIG. 1 as being positioned horizontally, we have determined that these plates can be disposed at an angle or can be arranged vertically, with equally satisfactory results.

The bank of nozzles is connected to a pump 64 by a tube 66, and the pump is connected to the radiator 24 by a tube 68. In turn, the radiator 24 is connected to the storage tank 16 by a tube 70. The tank 16 has a drain and valve 72, for a purpose to appear.

A tube 74 connects the tank 16 with the filter 18, and the latter is connected to the sump 54 of the condenser 14 by a tube 76.

Connected to the exhaust manifolds 38 and 40 are tubes 78 and 80, respectively, which are connected together and then connected to the inlet 50 of the condenser 14 by means of an exhaust tube 82.

Connected to the gas outlet 52 of the condenser 14 is a return tube 84 which is connected to the tube 44 between the air inlet and the carburetor, through a tube 86 and a butterfly valve 88, and to the rear intake manifold 36 through a tube 90 and a butterfly valve 92.

Also connected to the condenser outlet tube 84, is a vent tube 93 containing a butterfly valve 95. As will be described more fully hereinafter, valve 95 can be opened when the engine is being started, and also during the operation of the engine in order to demonstrate the operability of the engine in a fully-closed system, as compared with the operation thereof when there is limited exhaust to the atmosphere.

When the equipment is used in an automobile of conventional construction, the storage tank 16 can be supported under the hood adjacent to the engine, the gasoline tank 30 is in its usual position at the rear of the vehicle, and the filter 18 and the catalytic converter 14 can be placed in the trunk of the vehicle.

Using conventional leaded gasoline as the fuel, nickel plates 60 in the condenser, with the valve 95 closed and the valves 88 and 92 in the open position and adjusted so that the back pressure on the engine is in the neighborhood of 1 to 3 pounds per square inch, the operation of the novel closed system internal combustion engine has been as follows.

The products of combustion which initially originate in the front bank of cylinders from the burning of the hydrocarbon fuel, and which possibly include carbon monoxide, carbon dioxide, free carbon, nitrates, nitrogen, water vapor, hydrogen and oxygen . . . in one form or another. . . pass through the tube or exhaust passage means 82 and into the converter 14 at the inlet 50.

We have ascertained that when the engine is being started (preferably with valve 95 open) and before it "stablizes," the temperature at the converter 14 is between about 250° F. to about 400° F., and that when using nickel baffles, the temperature will suddenly "stablize" at either 125° F. or 143° F. or 158° F., plus or minus about 2 degrees. If the valve 95 has been open, it is then closed and the engine will run in a fully closed system. We have no explanation as to why the engine will stablize at the 125° F. level during one "run" and at the other temperatures during other runs. We do know, however, that the drop in temperature and back pressure occurs very suddenly and that the temperature will remain substantially constant, regardless of the load on the engine.

The water vapor in the exhaust and/or which is formed in the condenser, condenses on the coil 56 and flows into the sump 54.

Solids, such as free carbon, sodium nitrate, and calcium nitrate which collect on the baffles 60, are washed therefrom by the water jet 62 and also flow into the sump 54.

A relatively large amount of methanol (wood alcohol) is usually formed and/or is collected in the condenser 14, and being miscible with water, also flows into the sump 54.

Glyoxal. . . possibly in the dihydrate form, which is soluable in hot water. . . also forms and/or is collected in the condenser and flows into the sump 54.

An appreciable amount of ammonia is also contained in the exhaust or is produced in the condenser. It is dissolved in the methanol (referred to above) and/or goes into solution with the water to form ammonium hydroxide.

From the sump 54, the aforementioned liquids and solid particles flow through the filter 18, where the solid particles such as carbon and the nitrates are removed, and the liquid phase then flows into the storage tank 16.

Because methanol is a recognized anti-freeze, it is actually advantageous to have it remain in the fluid system. However, inasmuch as appreciable amounts of water and methanol are formed during the operation of the engine, it is necessary to periodically drain the excess liquid from the storage tank 16 through the drain valve 72.

Methanol also burns and is usable as a fuel, and, accordingly, it can be removed from the liquid phase by distillation, and introduced into the carburetor 28 with the gasoline from the tank 30. In like manner the aforementioned solids may also be reintroduced into the engine as fuel.

Returning to a consideration of gases which flow from the outlet 52 of the condenser, these appear to include primarily carbon monoxide, carbon dioxide, hydrogen and methane.

As mentioned hereinabove, we have achieved the best results from the standpoint of maximum power, smoothest operation, and the formation of the smallest amounts of solid chemical compounds during the closed system operation, by adjusting the valves 88 and 92 to provide for a controlled distribution of return gases into the intake manifold 36 and into the tube 44 at the carburetor 28 such that the back pressure at the exhaust manifolds is at a minimum, which in most instances is from about 1 to 3 pounds per square inch, whereby the operation of the engine is "stabilized." This also results in the mimimum requirement of additional air being brought into the system through the air intake and filter assembly 32, whereby the amounts of nitrogen compounds which are produced are maintained at a minimum.

To demonstrate the effectiveness of operating the engine in a fully closed system, we have opened the valve 95 while the engine is running, with the result that the speed of the engine increases with some exhaust to the atmosphere. However, when the valve 95 is again closed, the engine returns to its previous mode of operation in the fully closed system.

Because the fuel appears to be "burned" or utilized more efficiently in our novel closed system internal combustion engine, the mileage per gallon of fuel is greatly increased over the mileage achieved in presently known internal combustion engines.

As mentioned hereinabove, our novel closed system internal combustion engine operates very effectively with presently known leaded gasoline, and, inasmuch as there is no gaseous exhaust, not lead compounds whatsoever are discharged into the atmosphere.

We have removed the head from the test engine after running on leaded gasoline for hundreds of hours, and the pistons and cylinder walls were bright and clean, and the only difference noted was a slight increase of lead deposits on the exhaust ports and on the valve stems. These deposits were not enough to adversely affect the operation of the engine, and, actually, the lead deposits on the valve stems were beneficial from the standpoint of lubrication.

We have also discovered that similar results can be achieved by replacing the nickel baffles 60 in the condenser with baffles made of aluminum, copper, zinc, magnesium or steel. In each instance, water, methanol, and ammonia were formed, as when the nickel baffles were used, but the "side effect" chemical compounds which are produced, were different.

Thus, with aluminum baffles, we obtained aluminum hydroxide and large quantities of hydrogen gas; with copper baffles we obtained large quantities of formaldehyde; with zinc baffles, we obtained ferro cynide and/or ferric ferrocynide; and, with magnesium baffles, we obtained magnesium hydroxide and very large amounts of hydrogen gas. Steel baffles in the condenser appeared to function primarily as a "mechanical" baffle or barrier, with the production of very little "side effect" chemical compounds.

We have also discovered that the production of what we have referred to as "side effect" chemical compounds can be greatly increased, with a corresponding diminution in power output, by recirculating more of the gaseous output of the condenser through the rear bank of cylinders, thereby increasing the back pressure, as for example, to about 35 pounds per square inch. This was achieved by partially closing valve 88 in order to limit the amount of "exhaust" gases which were returned to the front intake manifold 34 through the carburetor 28.

Figure 2:
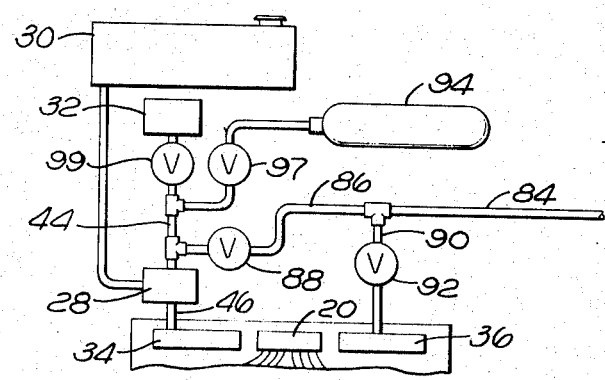
FIG. 2 is a fragmentary schematic drawing of a first alternative form of engine in which oxygen is supplied to the engine together with or in place of air.

Referring to FIG. 2, it shows a first alternative form of engine in which an oxygen cylinder 94 is connected to the tube 44 through a valve 97, and another valve 99 is provided in the tube 44 upstream of the oxygen in order to close off air from the air inlet assembly 32. In all other respects, the construction is the same as shown in FIG. 1.

Thus, in the form of the invention shown in FIG. 2, the valve 99 can be closed and the valve 97 opened, whereby no air enters the system and the engine "runs" on oxygen, or the valve 99 can be fully opened and the valve 97 opened only a small amount, whereby a very limited amount of oxygen is mixed with the incoming air in order to "enrich" it.

When using this alternative form with the valve 99 closed and the valve 97 open, and with nickel baffles 16 in the condenser 14, large quantities of hydrogen gas and carbon monoxide were formed and recirculated through the engine via tubes 86 and 90, for increased power. This construction has the further advantage that no nitrogen compounds are formed because no air (containing nitrogen) is used. It also results in the production of larger amounts of methanol and smaller amounts of water.

Figure 3:
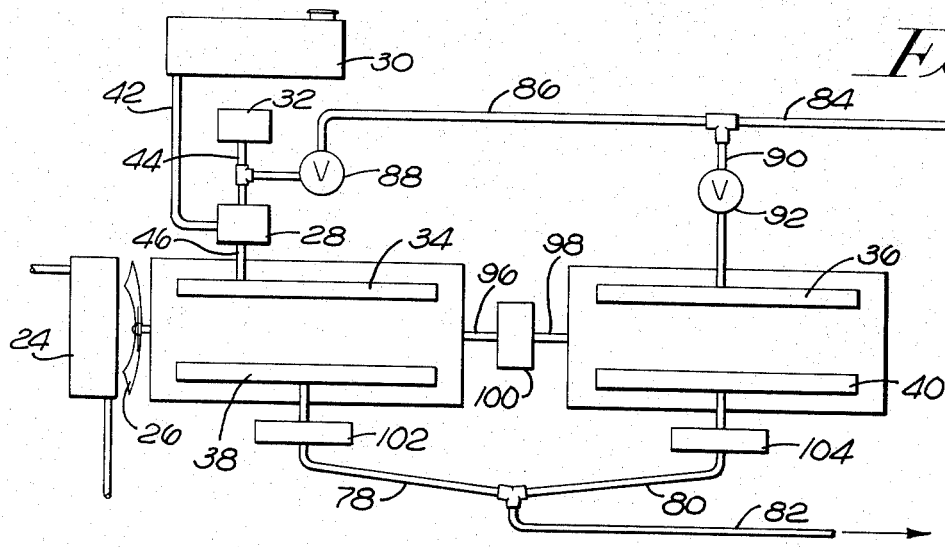
FIG. 3 is a fragmentary, schematic drawing of a second alternative form of engine in which two separate engines are interconnected by means of a variable torque converter or coupling.

Referring to FIG. 3, it shows a second alternative form of engine which is similar to the form shown in FIG. 1 in that it does not use any oxygen, but it differs from FIG. 1 in that the front and rear and banks of cylinders are physically separated, whereby the drive or crank shaft 96 of the front bank of cylinders is connected to the drive or crank shaft 98 of the rear bank of cylinders by means of a torgue converter or coupling 100. This form also contains cooling means 102 and 104 in the tubes 78 and 80, respectively, in addition to or in place of the cooling assembly 58. Stated somewhat differently, we have achieved the same results by cooling the exhaust gases either in the tubes 78 and 80, or in the condenser housing 48.

It is recognized that this alternative form may be too complex and possibly too cumbersome for use in vehicles, but it appears to be ideally suited for stationary engine use, particularly where it is desirable to produce the "side effect" chemical compounds when power requirements are low.

We have also discovered that our novel closed system internal combustion engine can operate on just about any type of hydrocarbon fuel, including conventional leaded and low lead gasoline, diesel fuel, turpentine, LPG and alcohol. We have used gasoline produced by various well-known refineries, containing different types of additives and sold under different brand names, and the main differences appear to be in the amount of carbon which is deposited on the spark plugs and the specific "side effect" chemicals which are produced or extracted from the exhaust gases.

Thus, it is apparent that there has been provided a novel closed system internal combustion engine which fulfills all of the objects and advantages sought therefore. Inasmuch as the system can be run "closed" insofar as the exhaust is concerned, there is no gaseous discharge and no pollution of the atmosphere. Accordingly, gasolines and other fuels can be used which have whatever additives are required for optimum operation efficiency, without regard for what may be contained in the exhaust from the engine.

We claim:

1. An internal combustion engine system including:
   an internal combustion engine assembly containing first and second banks of combustion chambers;
   first and second inlet means in controlled communication with the first and second banks of combustion chambers, respectively;
   first and second outlet means in communication with the first and second banks of combustion chambers, respectively;
   a condenser housing having a gas inlet, a gas outlet, and a liquid outlet;
   cooling means in the condenser housing;
   baffle means in the condenser housing;
   means in the condenser housing for directing fluid onto said baffle means;
   means for introducing an air/fuel mixture into the first inlet means of the first bank of combustion chambers;
   exhaust passage means interconnecting the first and second outlet means of the combustion chambers with the gas inlet of the condenser housing; and
   return passage means interconnecting the gas outlet of the condenser housing with the first and second inlet means of the combustion chambers.

2. An internal combustion engine system as set forth in claim 1, which further includes valve means in the return passage means to the inlet means of the combustion chambers, for modulating the amounts of gases which are returned to each bank of cylinders.

3. An internal combustion engine system as set forth in claim 1 in which the means for introducing an air/fuel mixture into the first inlet means includes an air filter assembly connected with a carburetor; and the return passage means to the first inlet means is connected downstream of the air filter assembly and upstream of the carburetor.

4. An internal combustion engine system as set forth in claim 2, which further includes an exhaust vent controlled by a valve in the exhaust passage means from the condenser housing, for opening the system during starting.

5. An internal combustion system as set forth in claim 1, in which the baffle means in the condenser housing is in the form of spaced apart plates made of nickel, aluminum, copper, zinc, magnesium or steel, or a mixture thereof.

6. An internal combustion engine system as set forth in claim 1, in which the baffle means in the condenser housing is in the form of thin, intertwined strips made of nickel, aluminum, copper, zinc, magnesium or steel, or a mixture thereof.

7. An internal combustion engine system as set forth in claim 1, which further includes:
   a closed storage tank having an inlet and an outlet;
   passage means interconnecting the outlet of the storage tank with the fluid directing means in the condenser housing; and
   passage means interconnecting the liquid outlet of the condenser housing with the inlet of the storage tank.

8. An internal combustion engine system as set forth in claim 7, which further includes pump means in the passage means interconnecting the outlet of the storage tank with the fluid directing means.

9. An internal combustion engine system as set forthe in claim 7, which further includes filter means in the passage means interconnecting the liquid outlet of the condenser housing with the inlet of the storage tank.

10. An internal combustion engine system as set forth in claim 1, which further includes means for introducing oxygen into the first inlet means of the first bank of combustion chambers.

11. An internal combustion engine system as set forth in claim 3, which further includes:
   valve means for controlling the amount of air from the air filter assembly; and
   a source of oxygen connected upstream of the carburetor.

12. An internal combustion engine system as set forth in claim 1, which further includes:
   a drive shaft; and
   pressure responsive means in the combustion chambers in driving relationship with said drive shaft.

13. An internal combustion engine system as set forth in claim 1, which further includes:
   first and second drive shafts interconnected through variable coupling means;
   pressure responsive means in the combustion chambers;
   means interconnecting the pressure responsive means in the first bank of combustion chambers with the first drive shaft; and
   means interconnecting the pressure responsive means in the second bank of combustion chambers with the second drive shaft.

* * * * *